United States Patent Office 3,025,301
Patented Mar. 13, 1962

3,025,301
ETHYL-4-PHENYL-N-ETHER ALKYLENE-4-PIPERIDINE CARBOXYLATES
Peter Marshall Frearson, Accrington, England, and Edward Severin Stern, Edinburgh, Scotland, assignors to J. F. MacFarlan & Company Limited, Boreham Wood, Hertfordshire, England, a British company
No Drawing. Filed Feb. 25, 1959, Ser. No. 795,334
Claims priority, application Great Britain Nov. 28, 1955
4 Claims. (Cl. 260—294.3)

This invention relates to novel piperidine compounds and their production. This application is a continuation in part of Serial No. 621,998, filed November 14, 1956, now abandoned.

The piperidine compounds of the invention are norpethidine derivatives of the general formula:

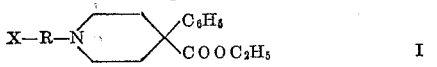

where X is a heterocyclic residue containing an oxygen atom or the benzyloxy group, and R is a straight or branched chain alkylene group having from one to six carbon atoms. X for example denotes the benzyloxy, tetrahydropyranyl, or tetrahydrofurfuryloxy group.

Of the compounds of the general Formula I we prefer 1-(2'-4''-tetrahydropyranylethyl)norpethidine, 1-(2'-benzyloxyethyl)norpethidine, 1 - tetrahydrofurfurylnorpethidine and 1-(4'-tetrahydropyran-2''-yloxybutyl)norpethidine.

The norpethidine derivatives of the present invention are physiologically active as spasmolytics, analgesics and/or cough-suppressants.

The analgesic potency of some of the compounds of the present invention, as compared with pethidine (potency 0.4) is shown in the following table:

| Compound | Potency | Examples in which substance is described |
|---|---|---|
| 1-(2'-benzyloxyethyl)norpethidine | 2 | III. |
| 1-tetrahydrofurfurylnorpethidine | 0.4 | IV. |
| 1-(4'-tetrahydropyran-2''-yloxybutyl)norpethidine | 0.4 | V. |

The norpethidine derivatives of the above general formula can be prepared by heating in the liquid phase norpethidine with a compound of the general formula X—R—Hal, where X and R have the above-defined meanings, and Hal is chlorine, bromine or iodine.

Alternatively compounds of the above general formula can be prepared by heating in the liquid phase a 1-(halogenoalkyl)norpethidine of the general formula:

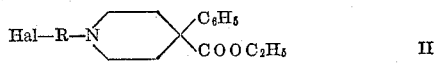

where R and Hal have the above-defined meanings, with a compound of the general formula X—Na, where X has the above-defined meaning. The above-mentioned 1-(halogenoalkyl)norpethidine can be prepared by reacting norpethidine with a compound of the general formula HO—R—Hal, where R and Hal have the above-defined meanings and conversion of the resulting 1-(hydroxyalkyl)norpethidine into the corresponding 1-halogenoalkyl compound. This method is inapplicable to the preparation of the substance of Example 1.

Alternatively the compounds of the above general Formula I can be prepared by heating in the liquid phase a di(chloroethyl) amine substituted by the group X—R, where X and R have the meanings given above with benzyl cyanide to form the corresponding 4-benzyl-4-cyanopiperidine which is then subjected to acid hydrolysis to convert the cyano group into a carboxyl group and esterifying the acid so obtained by heating under acid conditions with excess of an anhydrous alcohol, e.g. ethyl alcohol, with removal of the water formed.

The following examples, in which parts are parts by weight, illustrate the production of the derivatives of the invention.

*Example I.—1-(2'-4''-Tetrahydropyranylethyl)-Norpethidine*

4-(2'-hydroxyethyl)tetrahydropyran, B.P. 114° C./16 mm., $n_D^{18}$ 1.4610 (Prelog, Kohlbach, Cerkovnikov, Rezek, and Piantanida, Annalen, 1937, 532, 69), was converted by means of thionyl chloride into 4-(2'-chloroethyl)tetrahydropyran, B.P. 87–89° C./14 mm., $n_D^{18}$ 1.4672. (Found: C, 56.7; H, 8.6; Cl, 23.3%. $C_7H_{13}OCl$ requires O, 56.5; H, 8.8; and Cl, 23.85%.)

Norpethidine (15 parts) and 4-(2'-chloroethyl)tetrahydropyran (10 parts) were refluxed in alcohol (100 parts) in the presence of anhydrous sodium carbonate (4 parts) for 24 hours. The mixture was filtered and distilled; the desired 1-(2'-4''-tetrahydropyranylethyl)-norpethidine had B.P. 190–200° C./mm. This substance is a potent analgesic.

*Example II.—1-(2'-Cyclohexyloxyethyl)Norpethidine*

A mixture of 2-chloroethyl cyclohexyl ether (35 parts) B.P. 84° C./16 mm., $n_D^{20}$ 1.4636 and norpethidine (50 parts) was refluxed in ethanol (400 parts) over sodium carbonate (20 parts) for 24 hours. The suspension was filtered and the filtrate concentrated. To the residual oil was added a slight excess of concentrated aqueous hydrobromic acid mixed with an equal volume of ethanol. On keeping, 1-(2'-cyclohexyloxyethyl)norpethidine hydrobromide separated as a crystalline solid which on recrystallisation from aqueous ethanol had M.P. 124° C.

*Example III.—1-(2'-Benzyloxyethyl)Norpethidine*

A mixture of chloroethyl benzyl ether (4 parts) and norpethidine (5 parts) in alcohol (50 parts) was refluxed for 24 hours over sodium carbonate (2 parts). The product was filtered and the filtrate concentrated. The residual oil was divided into two parts. To one part was added a slight excess of concentrated aqueous hydrobromic acid, which gave an immediate precipitate of 1-(2'-benzyloxyethyl)norpethidine hydrobromide; on crystallisation from aqueous alcohol this had M.P. 138–139° C. The remainder of the residual oil was fractionally distilled, when the free base, 1-(2'-benzyloxyethyl)norpethidine, B.P. 220° C./0.5 mm., $n_D^{20}$ 1.5425 was obtained. This substance is a potent analgesic.

*Example IV.—1-Tetrahydrofurfurylnorpethidine*

A mixture of tetrahydrofurfuryl chloride (25 parts) and norpethidine (30 parts) was kept for 48 hours in boiling pentanol over sodium carbonate. Filtration of the product and vacuum distillation of the filtrate gave 1-tetrahydrofurfurylnorpethidine, B.P. 175–180° C./0.7 mm., $n_D^{20}$ 1.5276.

*Example V.—1-(4'-Tetrahydropyran-2''-Yloxybutyl)-Norpethidine*

A mixture of 4-2'-tetrahydropyranyloxybutyl chloride (50 parts), B.P. 94° C./3 mm., $n_D^{20}$ 1.4608, and norpethidine (60 parts) was heated in amyl alcohol for 48 hours the acid formed being neutralised with sodium carbonate. Filtration of the product and distillation of the filtrate in vacuo gave 1-(4'-tetrahydropyran-2''-ylbutyl)norpethidine, B.P. 200° C./1 mm., $n_D^{20}$ 1.5135.

What we claim is:
1. Norpethidine derivatives of the formula

wherein X is selected from the group consisting of tetrahydropyranyl and tetrahydrofurfuryl groups and R is selected from the group consisting of an alkylene group having from one to six carbon atoms inclusive and an oxybutyl radical.

2. 1-(2'-4''-tetrahydropyranylethyl)norpethidine.
3. 1-tetrahydrofurfurylnorpethidine.
4. 1-(4'-tetrahydropyran-2''-yloxybutyl)norpethidine.

References Cited in the file of this patent

UNITED STATES PATENTS

| | | |
|---|---|---|
| 1,886,481 | Hartmann et al. | Nov. 8, 1932 |
| 2,400,913 | Burger | May 28, 1946 |
| 2,784,192 | Schmidle et al. | Mar. 5, 1957 |
| 2,824,875 | Elpern | Feb. 25, 1958 |
| 2,846,437 | Elpern | Aug. 5, 1958 |
| 2,850,500 | Elpern | Sept. 2, 1958 |
| 2,880,211 | Elpern | Mar. 31, 1959 |

OTHER REFERENCES

Elpern et al.: Abstract Papers, 130th Meeting of Am. Chem. Soc., September 1956, 7N, No. 11.